March 24, 1942. F. T. HARRINGTON 2,277,640
POWER TRANSMISSION
Filed June 3, 1938
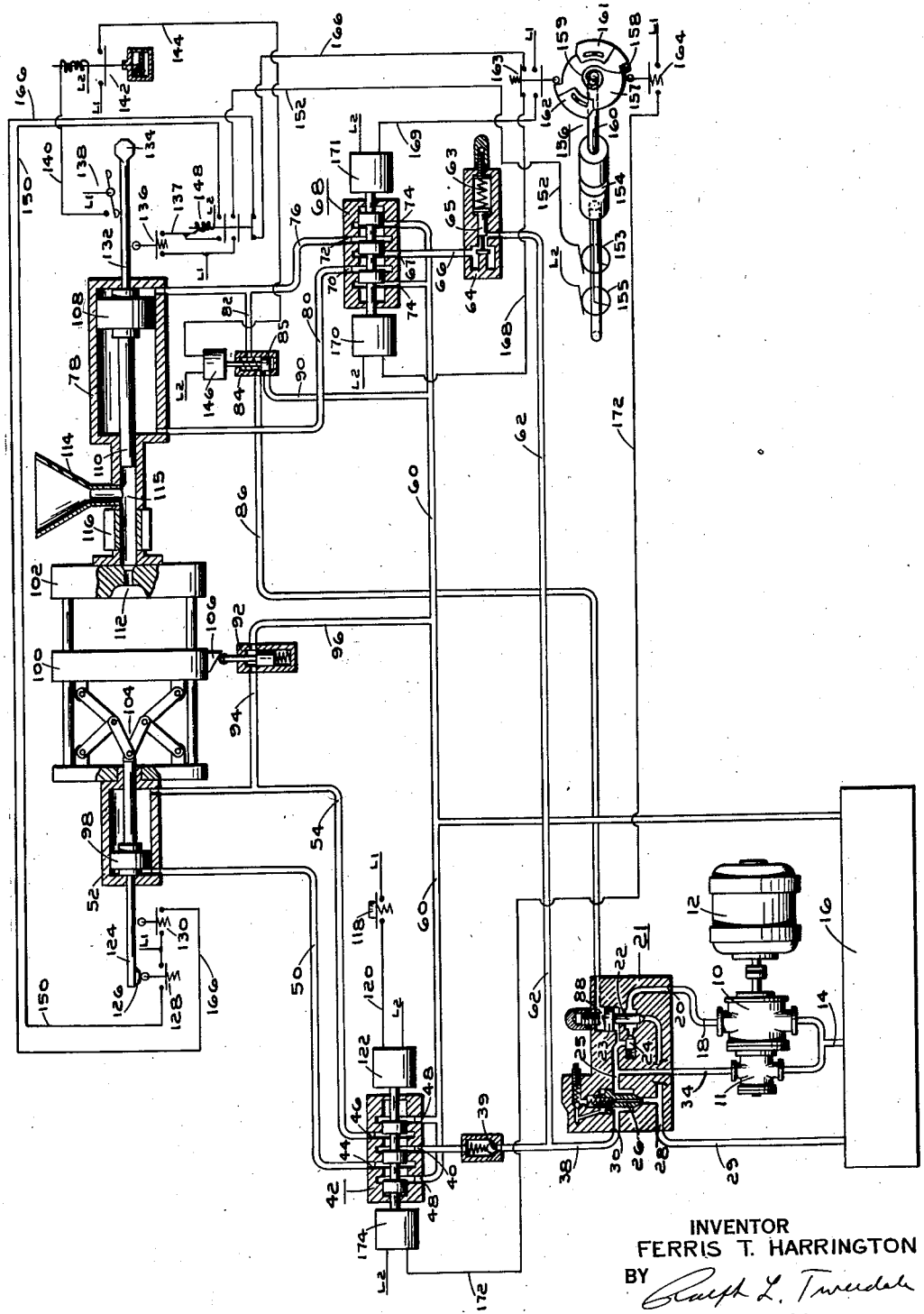
INVENTOR
FERRIS T. HARRINGTON
BY
ATTORNEY Patented Mar. 24, 1942

2,277,640

UNITED STATES PATENT OFFICE 2,277,640

POWER TRANSMISSION

Ferris T. Harrington, Detroit, Mich., assignor to Vickers Incorporated, Detroit, Mich., a corporation of Michigan Application June 3, 1938, Serial No. 211,623

2 Claims. (Cl. 60—52)

This invention relates to power transmissions, particularly to those of the type comprising two or more fluid pressure energy translating devices one of which may function as a pump and another as a fluid motor.

This invention is particularly concerned with a power transmission system adapted for operating a plurality of hydraulic motors in predetermined sequence and may be used, for example, in a hydraulically operate injection molding machine. In the art of injection molding machines, it is common to provide means for opening and closing the dies in which the material is molded and ram means for injecting the material into the mold.

It is essential to inject the hot plastic material into the die as rapidly as possible to prevent premature cooling of the material before the cavity of the die is completely filled, thus causing imperfections in finished work. The object of this invention is to accomplish this end with a minimum power input and the least possible power loss resulting in the least heating of the fluid medium in the system. It is desirable that the pump delivery be maintained at a maximum during the entire injection cycle to insure maximum speed of the piston. On the other hand, during the remaining parts of the cycle it is desirable to reduce the pump delivery to a minimum as quickly as possible after the operating pressure rises at the end of a working stroke.

Another object of this invention is to provide pump means which will at once deliver fluid at large volume-low pressure and low volume-high pressure and pressure responsive means whereby the large volume-low pressure delivery may be unloaded while the low volume-high pressure delivery is utilized for operation of the fluid motor.

Another object is to provide means for effecting the operation of the aforementioned pressure responsive unloading means.

Still another object is to provide a method for rendering the said unloading means inoperative during one portion of the cycle of the fluid motor.

In the drawing:

The single figure is a diagrammatic view of the hydraulic and electric circuit of a preferred form of the present invention.

In the drawing, a double pump 10 and 11, which may be of the fixed displacement type continuously driven by a prime mover such as an electric motor 12, has a suction conduit 14 adapted to draw fluid from a tank 16. Fluid is delivered from pump 10 through a conduit 18 to a port 20 of a combination valve 21. This valve consists of an unloading valve 22, a check valve 24, and a relief valve 26.

The valve 22 which is spring biased downwardly has a piston 23. The purpose of this valve is to unload the full delivery of pump 10 at a certain predetermined time as will later be described more fully.

The relief valve 26, while shown as similar to that in the Patent No. 2,043,453 to Harry F. Vickers, may be of any conventional construction.

The check valve 24 is located in a passage 25 and permits free flow of fluid from valve 22 to valve 26.

The combination valve also has a tank port 28 and a delivery port 30. The valves 22 and 26 are adapted to pass fluid from the port 28 through a conduit 29 to the tank.

Pump 11 delivers fluid through a conduit 34 to the passage 25 connecting unloading valve 22 and relief valve 26. Port 30 is connected by a conduit 38 to a check valve 39 and a port 40 of a solenoid-operated four-way valve 42. The latter also has cylinder ports 44, 46, and tank ports 48. Port 44 is connected by a conduit 50 to the head end of a cylinder 52, and port 46 is connected by a conduit 54 to the rod end of cylinder 52. Ports 48 are connected to tank by a conduit 60.

Conduit 38 has a branch conduit 62 leading to a pressure reducing valve 64 which permits independent adjustment of the injection pressure. A spring 63 of valve 64 holds a valve member 65 in its open position as shown in the drawing. If the pressure in a conduit 66 rises above the setting of spring 63, valve member 65 will move to the right, thereby reducing the delivery of fluid to the injection cylinder to the predetermined pressure. Valve 64 is connected by the conduit 66 to a port 67 of a solenoid-operated four-way valve 68. The latter has cylinder ports 70, 72 and tank ports 74. Port 72 is connected by a conduit 76 to the head end of a cylinder 78. Port 70 is connected by a conduit 80 to the rod end of the cylinder 78. Ports 74 of the four-way valve 68 are connected to tank by the conduit 60.

Conduit 76 is connected by a conduit 82 to a solenoid-operated three-way valve 84. A movable valve member 85 in valve 84 is normally spring biased downwardly which permits free flow from the conduit 82 to a conduit 86; at the same time valve member 85 blocks a tank conduit 90. The conduit 86 extends to a chamber 88 of the unloading valve 22 and the conduit 90 extends to the conduit 60 to tank. When the member 85 is raised it blocks the conduit 82 and opens conduit 86 to conduit 90.

A cam-operated bypass valve 92 for unloading of the high pressure pump 11 when the machine is in the position shown in the drawing is connected to conduit 54 by a conduit 94 and to tank by a conduit 96 and the conduit 60.

Slidably mounted in cylinder 52 is a piston 98 which is utilized to press a die 100 against a mold block 102 through a toggle mechanism 104. The die 100 carries a cam 106 which when in its extreme left hand position depresses the spool of the valve 92.

A piston 108, slidably mounted in the cylinder 78, carries a ram 110 which has for its purpose the injecting of the material to be molded into a mold cavity 112 of the mold block 102. The material for injection is fed from a hopper 114 into a chamber 115. A heating element 116 is provided for melting the material before injection into the mold.

A push button starting switch 118 is connected to one side of a line $L^1$ and by a conductor 120 to a solenoid 122 of the four-way valve 42, and thence to the other side of the line $L^2$.

Piston 98 carries a rod 124 on which is mounted a cam 126 for actuation of single circuit limit switches 128 and 130. Piston 108 carries a rod 132 having a cam 134 for actuating a single circuit limit switch 136 and a snap switch 138. Snap switch 138 connects the line $L^1$ by a conductor 140 to the operating coil of a single circuit time delay relay 142. The latter connects the line $L^1$ by a conductor 144 to a solenoid 146 of the three-way valve 84, thence to line $L^2$.

Limit switch 136 connects line $L^1$ to the operating coil of a holding relay 148 by a conductor 137. The upper circuit of the relay 148 connects the relay's operating coil by a conductor 150 and the limit switch 128 to the line $L^1$, thus forming a holding circuit for relay 148.

The center circuit of the relay 148 extends from line $L^1$ by a conductor 152 and collector ring 153 to a constantly rotating electromagnetic clutch 154, thence by collector ring 155 to line $L^2$. The clutch is driven from a constant speed shaft to form a time delay mechanism 156. The time delay mechanism 156 has a cam disk 157 and is rotatable in a counterclockwise direction by clutch 154 but is held from possible clockwise rotation by a stationary pin 158. A spring 159 urges the disk 157 clockwise but may be overcome by the force applied through clutch 154 when energized. When the clutch 154 is released after having rotated the disk 157 counterclockwise, the disk is returned to the position shown in the drawing by spring 159 the inner end of which is fastened to a shaft 160 which carries disk 157 and the outer end of which is fastened to the pin 158. The cam disk 157 carries adjustable cams 161 and 162 which are adapted to depress limit switches 163 and 164 respectively after adjustable predetermined amounts of rotation of disk 157.

The lower circuit of relay 148 is included in a circuit extending from the line $L^1$, through the limit switch 130, and conductor 166 to the upper circuit of the limit switch 163 and from there by a conductor 168 to a solenoid 170 of the four-way valve 68, and thence to line $L^2$.

The lower circuit of limit switch 163 extends from the line $L^1$ by a conductor 169 to a solenoid 171 of the four-way valve 68, thence to line $L^2$.

The circuit of limit switch 164 extends from the line $L^1$ by a conductor 172 to a solenoid 174 of the four-way valve 42, thence to line $L^2$.

In operation, starting with the parts in the position shown in the drawing, and the pumps 10 and 11 operating, pump 10 delivers fluid through conduit 18, port 20 of combination valve 21, unloading valve 22, check valve 24, to passage 25. The combined flow of pumps 10 and 11 passes through relief valve 26, port 30 to conduit 38, check valve 39, port 40 of the four-way valve 42, port 46, and the conduit 54, to the rod end of cylinder 52.

As piston 98 is now in its extreme left position, it will not move. The die block 100 also being in its extreme left position causes cam 106 to open valve 92. Therefore, pressure fluid is passed from conduit 54 through conduit 94, valve 92, conduit 96, and conduit 60 to tank.

Pressure fluid is also delivered from conduit 38, conduit 62, the pressure reducing valve 64, conduit 66, to port 67 of four-way valve 68, port 70, and the conduit 80, to the rod end of cylinder 78. The piston 108 being in its extreme right position, it will not move.

To start the machine, the push button switch 118 is momentarily depressed which energizes the right hand solenoid 122 of the four-way valve 42 from line $L^1$, conductor 120. Accordingly the valve 42 is shifted to the right.

Pressure fluid from the port 40 is now delivered to port 44 through conduit 50 to the head end of the cylinder 52. At the same time port 46 is connected to one of the ports 48. Fluid from the rod end of cylinder 52 therefore passes through conduit 54, ports 46 and 48 of valve 42, and conduit 60 to tank.

As the piston 98 moves to the right to position the die 100 against the mold block 102 through toggle mechanism 104, cam 106 rides off of bypass valve 92, thereby closing the same. When the piston 98 reaches its extreme right hand position, cam 126 depresses limit switch 130, thereby making the circuit from the line $L^1$, conductor 166 which is closed at relay 148, limit switch 163, conductor 168 to energize the left hand solenoid 170 of the four-way valve 68. Accordingly the valve 68 is shifted to the left. During the small interval required for valve 68 to complete its movement the piston 98 stalls and the full pressure of the pump is maintained, although the bypass valve 22 may open to bypass the large volume pump 10.

As the pressure rises in the head end of cylinder 52, it accordingly rises in passage 25 of the combination valve 21. When this pressure rise exceeds the spring setting of valve 22, its action on the bottom of piston 23 causes valve 22 to rise, unloading the total delivery of the pump 10 to tank through port 28 and conduit 29.

Pressure fluid from the port 67 is now delivered to the port 72 through conduit 76 to the head end of cylinder 78. At the same time port 70 is connected to one of the ports 74. Fluid in the rod end of cylinder 78 therefore passes through conduit 80, ports 70 and 74 of the four-way valve 68, and conduit 60 to tank.

While pressure fluid is being delivered to the head end of cylinder 78, an equal pressure is being transmitted to the chamber 88 of unloading valve 22 from conduit 76, conduit 82, three-way valve 84, and conduit 86, thereby preventing the valve 22 from unloading the delivery of the pump 10 to tank. Thus the full delivery of the pump 10 is utilized during the injection stroke of the piston 108 to cause said injection to occur at full speed.

The material, having been fed by hopper 114 into chamber 115, is now melted by the heating element 116. As the piston 108 moves to the left, causing the ram 110 to inject the melted material into the mold 112, cam 134 trips snap switch 138 making the circuit from the line L¹, conductor 140, to the operating coil of the time delay relay 142. The single controlled circuit of the latter will not be made until just after the piston 108 reaches its extreme left hand position. Just after the piston 108 reaches its extreme left hand position, the time delay relay 142 closes its circuit from the line L¹ to energize the solenoid 146 through the conductor 144. Accordingly valve 84 rises, relieving the pressure in the chamber 88 through conduit 86, valve 84, conduit 90, conduit 60 to tank, and at the same time blocking the conduit 82. This permits valve 22 to open, unloading pump 10 while pump 11 continues to deliver oil to cylinder 78 for the maintenance of pressure thereon, the excess oil discharging to tank through relief valve 26.

Just before the piston 108 reaches its extreme left hand position, cam 134 depresses limit switch 136 which establishes a circuit from the line L¹, conductor 137 to energize the operating coil of the relay 148. The relay 148 establishes its own holding circuit from line L¹, limit switch 128, which is now closed, conductor 150, relay 148 to the latter's operating coil. At the same time solenoid 170 is deenergized.

The center circuit of relay 148 is now established from line L¹, conductor 152 to the electromagnetic clutch 154. When the electromagnetic clutch 154 becomes energized, it clutches time delay mechanism 156, rotating cam disk 157 through shaft 160. After a predetermined interval cam 161 depresses limit switch 163 which establishes a circuit from the line L¹, conductor 169 to energize the right hand solenoid 171 of the four-way valve 68. Accordingly valve 68 is shifted to the right. Fluid pressure is then delivered from the pressure port 67 of the valve 68 to port 70, conduit 80, to the rod end of the cylinder 78, causing piston 108 and ram 110 to return from the injection stroke after having dwelled for a period of time equal to the time required for cam 161 to travel from its rest position to where it depresses limit switch 163. Fluid from the head end of the cylinder 78 is returned to tank by conduit 76, ports 72 and 74 of the four-way valve 68, and conduit 60.

Cam 134 now rides off of limit switch 136, but relay 148 remains energized because of its own holding circuit. Cam 134 also contacts snap switch 138, breaking the circuit to the time delay relay 142, causing it to deenergize which in turn breaks the circuit to the solenoid 146 of valve 84. The spool of valve 84 is now spring biased downwardly opening chamber 88 to tank pressure through conduit 86, valve 84, and conduit 82.

Cam disk 157 continues to revolve; until after a predetermined time, cam 162 depresses limit switch 164 establishing a circuit from the line L¹, conductor 172 to energize the left hand solenoid 174 of the four-way valve 42. Accordingly valve 42 is shifted to the left, delivering pressure fluid from the pressure port 40 of valve 42 to port 46, conduit 54 to the rod end of the cylinder 52, causing the piston to retract after having held die 100 against mold block 102 for a predetermined period of time to allow the injected material to cool in the mold 112, this period being equal to the time taken by cam 162 to depress limit switch 164 after cam 161 has depressed limit switch 163. Fluid from the head end of cylinder 52 is returned to tank by conduit 50, port 44, one of the ports 48 of the valve 42, and conduit 60.

When cam 126 depresses limit switch 128, it breaks the holding circuit 150 of relay 148 which in turn breaks the circuit 152 to the electromagnetic clutch 154 causing it to release time delay mechanism 156. Accordingly cam disk 157 is returned to the position shown in the drawing by the action of the spring 159, and solenoids 174 and 171 are thereby deenergized.

As the die 100 reaches its extreme left hand position, cam 106 depresses valve 92, bypassing the pressure fluid from conduit 54, through conduit 94, valve 92, conduit 96, and conduit 60 to tank. All of the solenoids being deenergized and the pump delivery being unloaded to tank, the machine now comes to a complete stop. By depressing the push button starting switch 118, another cycle will take place.

It will be noted that the mechanism above described is peculiarly adapted to meet the peculiar problems arising in an injection molding machine. The injector ram 110 must be moved at full speed throughout its entire stroke, and yet at the same time it is necessary to independently vary the pressure which is exerted on this ram. The provision of the control mechanism associated with conduit 86 and chamber 88 permits this maintenance of full speed at the piston 108 without causing wastage of power during the other three strokes of the operating cycle when the piston 98 or 108 stalls at the end of such stroke.

It will be noted that the inner limit of stroke of the injector ram 110 may vary due to differences in density, softness, or flash leakage of the material injected, and for this reason the switch 138 is arranged to be actuated at a point somewhat prior to the end of the shortest injecting stroke which is ever encountered, and the time delay relay 142 is utilized for controlling the three-way valve 84. Thus it is made certain that the pump 10 will not be unloaded before the completion of an injecting stroke regardless of variations in length thereof, while at the same time it is insured that pump 10 will be unloaded in a reasonably short interval after the completion of this stroke.

The reducing valve 64 provides for independent adjustment of the pressure effective during the injection stroke in such a manner that this pressure may be adjusted without disturbing the maximum pressure settings of the relief valve 26 or the unloading valve 22.

The check valve 39 assists in maintaining the die block 100 closed and prevents any momentary pressure drops which might occur in the line 62 as the injection stroke starts from affecting the piston 98.

While the form of embodiment of the invention, as herein disclosed, constitutes a preferred form, it is to be understood that other forms might be adopted, all coming within the scope of the claims which follow.

What is claimed is as follows:

1. A fluid power transmission system comprising a plurality of fluid motors, a large volume pump and a small volume pump, directional control means and conduits including a common delivery conduit connecting said pumps to deliver fluid jointly to each of said motors in sequence, an unloading valve responsive to the delivery pressure in said common delivery conduit for bypassing the delivery of the large volume pump when the pressure in said common delivery conduit exceeds a predetermined value, and valve means controlled by one motor for temporarily rendering the unloading valve ineffective during at least a portion of the working stroke of said one motor.

2. A fluid power transmission system comprising two pump means forming a common source of pressure fluid having a common delivery conduit, a fluid motor operable on the fluid from said source in predetermined cycles, means for controlling the delivery of fluid to the motor, means for bypassing the delivery of one pump in response to predetermined pressure rise in the delivery conduit, said means including a member shiftable between a first and second position for controlling the pump bypass to cause delivery respectively of a large or a small volume, means biasing the member toward the first position, first piston means effective to shift and maintain said member in the first position, second piston means effective to shift said member to the second position, a conduit permanently connecting the second piston means with the delivery conduit, and a conduit and valve selectively connecting the first piston means to one side of the motor or to an exhaust.

FERRIS T. HARRINGTON.